United States Patent
Poirier et al.

(10) Patent No.: US 10,374,271 B2
(45) Date of Patent: Aug. 6, 2019

(54) BATTERY CELL ASSEMBLY SUPPORT STRUCTURE

(71) Applicant: Ford Global Technologies, LLC, Dearborn, MI (US)

(72) Inventors: Eric Poirier, Brownstown, MI (US); Benjamin A. Tabatowski-Bush, South Lyon, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 303 days.

(21) Appl. No.: 15/215,876

(22) Filed: Jul. 21, 2016

(65) Prior Publication Data
US 2018/0026320 A1    Jan. 25, 2018

(51) Int. Cl.
*H01M 10/6551* (2014.01)
*H01M 10/04* (2006.01)
*H01M 2/10* (2006.01)
*H01M 10/625* (2014.01)
*H01M 10/627* (2014.01)

(52) U.S. Cl.
CPC ..... *H01M 10/6551* (2015.04); *H01M 2/1077* (2013.01); *H01M 10/0481* (2013.01); *H01M 10/625* (2015.04); *H01M 2/1083* (2013.01); *H01M 10/0486* (2013.01); *H01M 10/627* (2015.04); *H01M 2220/20* (2013.01); *Y02T 10/7005* (2013.01)

(58) Field of Classification Search
CPC .................. H01M 2/1077; H01M 10/6551
See application file for complete search history.

(56) References Cited

U.S. PATENT DOCUMENTS

| | | | |
|---|---|---|---|
| 9,050,898 B2 | 6/2015 | Syed et al. | |
| 2010/0307723 A1* | 12/2010 | Thomas | B60H 1/00278 165/104.33 |
| 2011/0117410 A1* | 5/2011 | Yoon | F28D 15/0275 429/120 |
| 2012/0009455 A1* | 1/2012 | Yoon | H01M 10/653 429/120 |
| 2012/0244404 A1 | 9/2012 | Obasih et al. | |
| 2014/0234687 A1 | 8/2014 | Fuhr et al. | |
| 2015/0236311 A1* | 8/2015 | Ambrosio | H01G 2/08 429/100 |

(Continued)

FOREIGN PATENT DOCUMENTS

| | | |
|---|---|---|
| DE | 112013003579 | 4/2015 |
| JP | 2012018915 | 1/2012 |
| WO | 2013154886 | 10/2013 |

OTHER PUBLICATIONS

Accel Thermal, Heat Sinks, retrieved from http://www.accelthermal.com/heat-sinks/ on Jun. 13, 2016.

*Primary Examiner* — Stephan J Essex
(74) *Attorney, Agent, or Firm* — Carlson, Gaskey & Olds, P.C.

(57) ABSTRACT

An exemplary battery cell support structure includes a thermal exchange plate, and a plurality of support fins providing a cavity to receive a battery cell assembly. The plurality of support fins extend directly from the thermal exchange plate. An exemplary method of supporting a battery cell within a battery pack includes positioning a battery cell assembly within a cavity provided by a plurality of support fins extending directly from a thermal exchange plate.

18 Claims, 2 Drawing Sheets

(56) References Cited

U.S. PATENT DOCUMENTS

2015/0333305 A1* 11/2015 Seki .................... H01M 2/1077
　　　　　　　　　　　　　　　　　　　429/120
2016/0064783 A1　　3/2016 Chorian et al.
2016/0111761 A1* 4/2016 Kopra ................. H01M 2/1077
　　　　　　　　　　　　　　　　　　　429/120

* cited by examiner

BATTERY CELL ASSEMBLY SUPPORT STRUCTURE

TECHNICAL FIELD

This disclosure relates generally to supporting battery cell assemblies within a battery pack of an electrified vehicle and, more particularly, to a battery cell assembly support structure that can also manage thermal energy levels with the battery pack.

BACKGROUND

Electrified vehicles differ from conventional motor vehicles because electrified vehicles are selectively driven using one or more electric machines powered by a battery pack. The electric machines can drive the electrified vehicles instead of, or in addition to, an internal combustion engine. Example electrified vehicles include hybrid electric vehicles (HEVs), plug-in hybrid electric vehicles (PHEVs), fuel cell vehicles (FCVs), and battery electric vehicles (BEVs).

A battery pack of an electrified vehicle can include one or more battery arrays each including a plurality of battery cell assemblies. The battery arrays can include a thermal exchange plate used to maintain a temperature of the battery cell assemblies within a desired range. The thermal exchange plate can take on thermal energy from the battery cell assemblies. A fluid, such as a liquid coolant or air, can then carry the thermal energy from the thermal exchange plate.

SUMMARY

A support structure for a battery cell assembly according to an exemplary aspect of the present disclosure includes, among other things, a thermal exchange plate, a plurality of support fins providing a cavity to receive a battery cell assembly. The plurality of support fins extend directly from the thermal exchange plate.

In a further non-limiting embodiment of the foregoing support structure, the support fins are formed together with the thermal exchange plate.

In a further non-limiting embodiment of any of the foregoing support structures, the support fins are extruded together with the thermal exchange plate.

In a further non-limiting embodiment of any of the foregoing support structures, a plurality of coolant fins extend from a side of the thermal exchange plate, and the plurality of support fins extend from an opposite side of the thermal exchange plate.

In a further non-limiting embodiment of any of the foregoing support structures, the coolant fins and the support fins are formed together with the thermal exchange plate.

In a further non-limiting embodiment of any of the foregoing support structures, the battery cell assembly is distributed along an axis with a plurality of other battery cell assemblies. The coolant fins and the support fins are axially aligned with each other.

A further non-limiting embodiment of any of the foregoing support structures includes a compression band that compresses the plurality of support fins against the battery cell assembly.

In a further non-limiting embodiment of any of the foregoing support structures, the plurality of support fins comprises a first support fin adjacent a first side of the battery cell assembly, and a second support fin adjacent an opposite, second side of the battery cell assembly.

In a further non-limiting embodiment of any of the foregoing support structures, the battery cell assembly is press-fit between the first fin and the second fin.

In a further non-limiting embodiment of any of the foregoing support structures, the thermal exchange plate provides a conduit configured to communicate a coolant.

A method of supporting battery cell assemblies within a battery pack according to another exemplary aspect of the present disclosure includes, among other things, positioning a battery cell assembly within a cavity provided by a plurality of support fins extending directly from a thermal exchange plate.

A further non-limiting embodiment of the foregoing method includes press-fitting the battery cell assembly into the cavity during the positioning.

In a further non-limiting embodiment of any of the foregoing methods, the support fins are formed together with the thermal exchange plate.

In a further non-limiting embodiment of any of the foregoing methods, the support fins are extruded together with the thermal exchange plate.

A further non-limiting embodiment of any of the foregoing methods includes moving a flow of fluid through channels provided by a plurality of coolant fins to cool the thermal exchange plate.

In a further non-limiting embodiment of any of the foregoing methods, the plurality of coolant fins extend directly from the thermal exchange plate on a side opposite the support fins.

In a further non-limiting embodiment of any of the foregoing methods, the battery cell assembly is distributed along an axis with a plurality of other battery cell assemblies, and the coolant fins and the support fins are axially aligned with each other.

A further non-limiting embodiment of any of the foregoing methods, includes moving a flow of liquid through a conduit in the thermal exchange plate to cool the thermal exchange plate.

In a further non-limiting embodiment of any of the foregoing methods the cavity has a first width, and the battery cell assembly has a second width greater than the first width prior to the positioning.

In a further non-limiting embodiment of any of the foregoing methods, the plurality of support fins comprises a first support fin adjacent a first side of the battery cell assembly, and a second support fin adjacent an opposite, second side of the battery cell assembly, wherein the method comprises compressing the first and second support fins against the battery cell assembly.

BRIEF DESCRIPTION OF THE FIGURES

The various features and advantages of the disclosed examples will become apparent to those skilled in the art from the detailed description. The figures that accompany the detailed description can be briefly described as follows.

DETAILED DESCRIPTION

This disclosure relates to a support structure for a battery cell assembly. The support structure incorporates a thermal exchange plate. Support fins of the support structure provide cavities that receive battery cell assemblies. The support fins are formed with the thermal exchange plate so that thermal energy can pass directly between the support fins and the thermal exchange plate.

Figure 1:
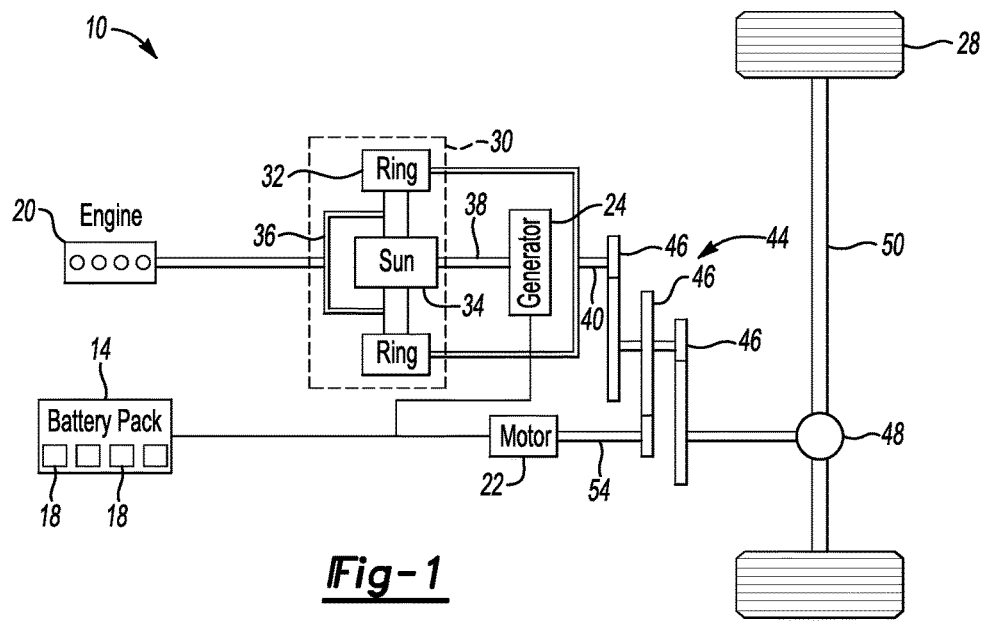
FIG. 1 illustrates a highly schematic view of a powertrain for an example electrified vehicle.

Referring to FIG. 1, a powertrain 10 of a hybrid electric vehicle (HEV) includes a battery pack 14 having a plurality of battery arrays 18, an internal combustion engine 20, a motor 22, and a generator 24. The motor 22 and the generator 24 are types of electric machines. The motor 22 and generator 24 may be separate or have the form of a combined motor-generator.

In this embodiment, the powertrain 10 is a power-split powertrain that employs a first drive system and a second drive system. The first and second drive systems generate torque to drive one or more sets of vehicle drive wheels 28. The first drive system includes a combination of the engine 20 and the generator 24. The second drive system includes at least the motor 22, the generator 24, and the battery pack 14. The motor 22 and the generator 24 are portions of an electric drive system of the powertrain 10.

The engine 20 and the generator 24 can be connected through a power transfer unit 30, such as a planetary gear set. Of course, other types of power transfer units, including other gear sets and transmissions, can be used to connect the engine 20 to the generator 24. In one non-limiting embodiment, the power transfer unit 30 is a planetary gear set that includes a ring gear 32, a sun gear 34, and a carrier assembly 36.

The generator 24 can be driven by the engine 20 through the power transfer unit 30 to convert kinetic energy to electrical energy. The generator 24 can alternatively function as a motor to convert electrical energy into kinetic energy, thereby outputting torque to a shaft 38 connected to the power transfer unit 30.

The ring gear 32 of the power transfer unit 30 is connected to a shaft 40, which is connected to the vehicle drive wheels 28 through a second power transfer unit 44. The second power transfer unit 44 may include a gear set having a plurality of gears 46. Other power transfer units could be used in other examples.

The gears 46 transfer torque from the engine 20 to a differential 48 to ultimately provide traction to the vehicle drive wheels 28. The differential 48 may include a plurality of gears that enable the transfer of torque to the vehicle drive wheels 28. In this example, the second power transfer unit 44 is mechanically coupled to an axle 50 through the differential 48 to distribute torque to the vehicle drive wheels 28.

The motor 22 can be selectively employed to drive the vehicle drive wheels 28 by outputting torque to a shaft 54 that is also connected to the second power transfer unit 44. In this embodiment, the motor 22 and the generator 24 cooperate as part of a regenerative braking system in which both the motor 22 and the generator 24 can be employed as motors to output torque. For example, the motor 22 and the generator 24 can each output electrical power to recharge cells of the battery pack 14.

Figure 2:
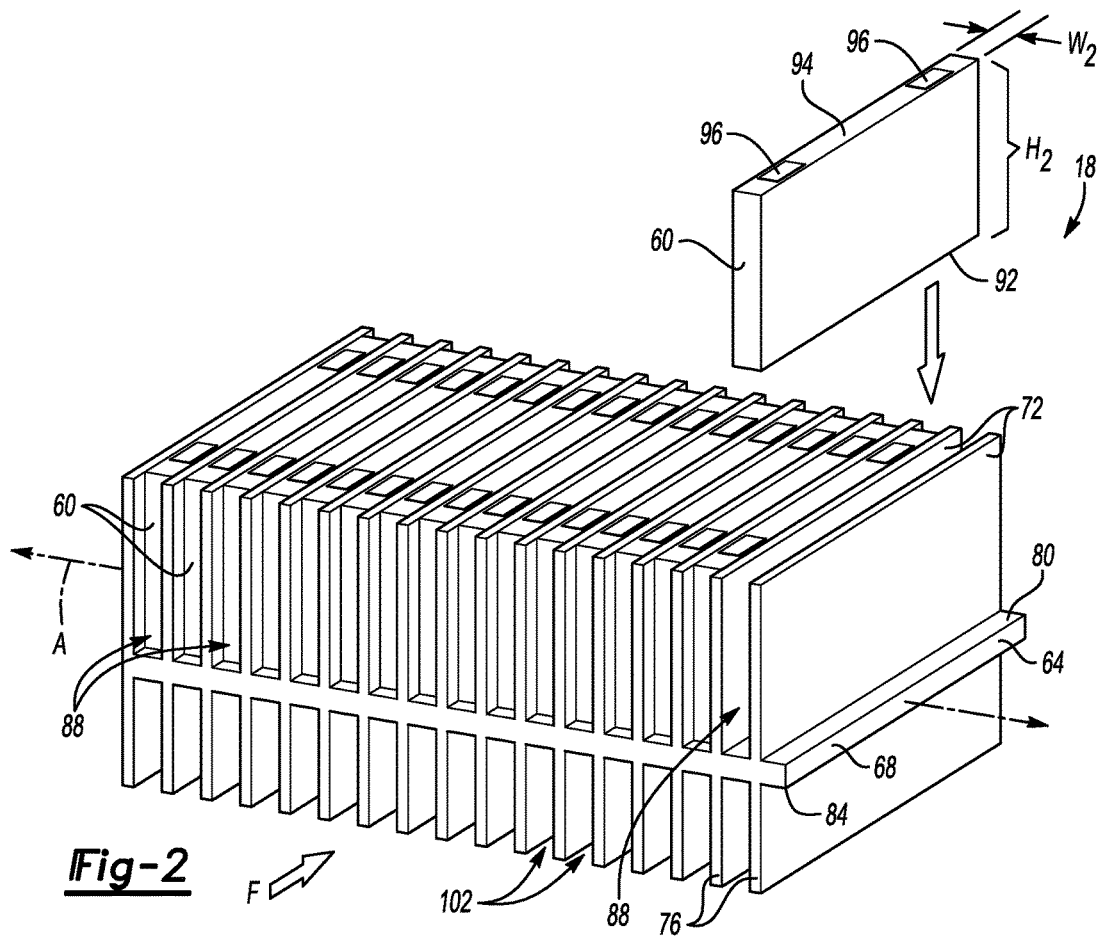
FIG. 2 illustrates a perspective, and partially expanded, view of a battery array of a battery pack from the powertrain of FIG. 1.
Figure 3:
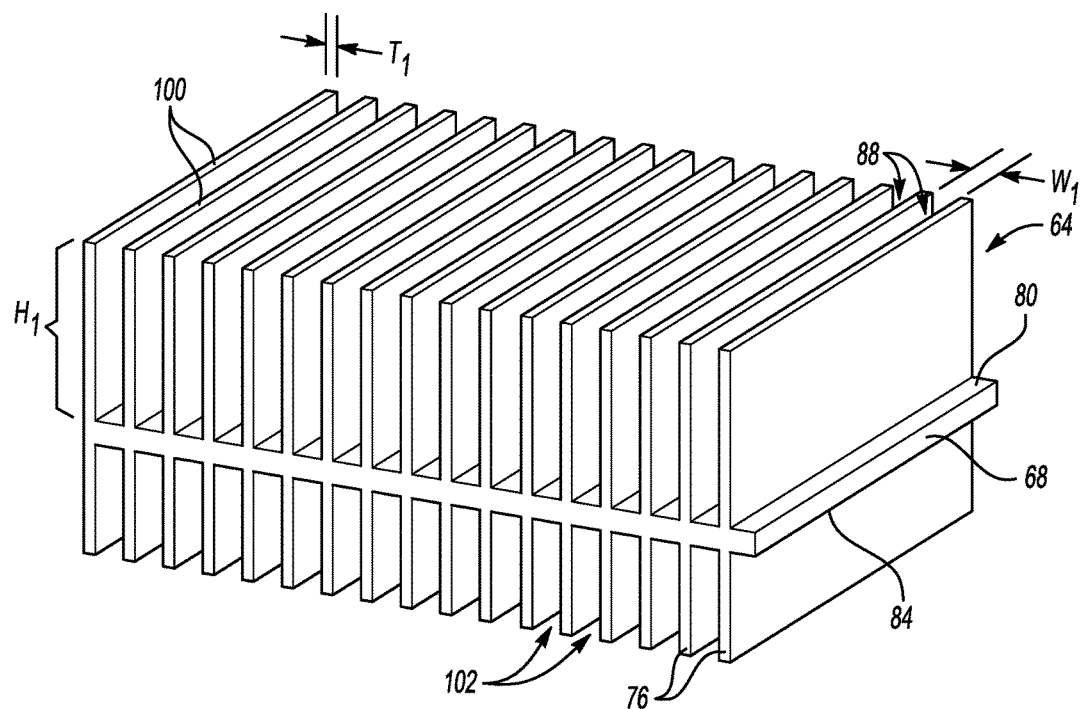
FIG. 3 illustrates a perspective view of a battery cell assembly support structure of the battery array of FIG. 2.

Referring now to FIGS. 2 and 3 with continuing reference to FIG. 1, an example battery array 18 includes a plurality of battery cell assemblies 60 and a battery cell assembly support structure 64. The battery cell assemblies 60 are disposed along an axis A. The battery pack 14 includes the battery array 18, and could include one or more additional battery arrays.

The support structure 64 includes a thermal exchange plate 68, a plurality of support fins 72, and a plurality of coolant fins 76.

In a non-limiting embodiment, the support fins 72 extend from a first side 80 of the thermal exchange plate 68, and the coolant fins 76 extend from a second side 84 that is opposite the first side 80. The first side 80 faces the battery cell assemblies 60. The second side 84 faces away from the battery cell assemblies 60. The support fins 72 and the coolant fins 76 extend directly from the thermal exchange plate 68.

In a non-limiting embodiment, the support fins 72 and the coolant fins 76 are formed together with the thermal exchange plate 68. In such an embodiment, the support fins 72, coolant fins 76, and thermal exchange plate 68 are part of a single continuous, seamless, and monolithic structure.

The battery cell support structure 64 could be formed by an extrusion process to cause the support fins 72 and the coolant fins 76 to form together with the thermal exchange plate 68. In such an example, the support fins 72, the coolant fins 76, and the thermal exchange plate 68 are all extruded together as different portions of a single extrusion.

The battery cell support structure 64 can be an aluminum material, copper, or another alloy. Aluminum could be particularly suitable if the battery cell support structure 64 is extruded.

In another non-limiting embodiment, the support fins 72 and the coolant fins 76 are formed separately from the thermal exchange plate 68, and then secured directly to the thermal exchange plate 68 to provide the battery cell support structure 64.

The support fins 72 are disposed along the axis A, and axially spaced from each other to provide a plurality of cavities 88. The battery cell support structure 64 holds each of the battery cell assemblies 60 within a respective one of the cavities 88 to support the battery cell assemblies 60. In another example, the cavities 80 can each hold more than one of the battery cell assemblies 60.

In a non-limiting embodiment, the cavities 88 have a width $W_1$, and the battery cell assemblies 60 have a width $W_2$. When the battery cell assemblies 60 are outside the cavities 88, the width $W_2$ is greater than the width $W_1$. That is, the battery cell assemblies 60 can be oversized relative to the cavities 88.

In such an embodiment, the battery cell assemblies 60 are press-fit into an installed positioned within the cavities 88. The slight oversizing and press-fit causes the battery cell assemblies 60 to compress axially in the installed position, which can facilitate good contact between the support fins 72 and the axially facing sides of the battery cell assemblies 60. In some examples, the battery cell assemblies 60 are pouch-style cells, which lack a relatively rigid outer casing and are thus compliant relative to the support fins 72. The pouch-style cells could have a jelly roll configuration.

In some examples, a conductive paste or thermal grease could be smeared on the battery cell assemblies 60, the battery cell support structure 64, or both. The paste or grease can facilitate transfer of thermal energy from the battery cell assemblies 60 to the support fins 72, and facilitate insertion of the battery cell assemblies 60 within the cavities 88.

In some non-limiting embodiments, the width $W_2$ of the battery cell assemblies 60 prior to positioning within the cavities 88 is from 5 to 10 millimeters. The width $W_1$ of the cavities 88 is then undersized less than 1 millimeter relative to the width $W_2$. For example, if the battery cell assemblies 60 had a width $W_2$ prior to positioning within the cavities 88 that is, say 10 millimeters, the cavities 88 could be sized to have a width $W_1$ that is 9 millimeters.

In another non-limiting embodiment, the width $W_2$ of the battery cell assemblies 60 prior to placement in the cavities 88 is slightly less than the width $W_1$ of the cavities 88. In such the embodiment, the battery cell assemblies 60 could be positioned within respective cavities 88 and then expand after a few charge cycles to compress against the support fins 72 and ensure good thermal contact. The expansion of the battery cell assemblies 60 causes the battery cell assemblies 60 to be lightly compressed within the cavities 88.

In yet another non-limiting embodiment, the width $W_2$ of the battery cell assemblies 60 prior to placement in the cavities 88 is configured to be the same as the width $W_1$ of the cavities 88. In such the embodiment, the battery cell assemblies 60 could be positioned within respective cavities 88 and then expand after a few charge cycles to compress against the support fins 72 and ensure good thermal contact. The expansion of the battery cell assemblies 60 causes the battery cell assemblies 60 to be lightly compressed within the cavities 88.

The battery cell assemblies 60 have a first surface 92 and an opposing second surface 94. In this non-limiting embodiment, the battery cell assemblies 60 each include terminals 96 extending through the second surface 94.

The first surface 92 directly contacts the thermal exchange plate 68 when the battery cell assemblies 60 are positioned within the cavities 88. The first surface 92 faces downwardly in this example. Thermal energy can move between the thermal exchange plate 68 and the battery cell assemblies 60 through the first surface 92, as well as between the axially facing surfaces of the battery cell assemblies 60 and the support fins 72.

During operation, thermal energy from the battery cell assemblies 60 can move directly from the battery cell assemblies 60 to the support fins 72. Then, since the support fins 72 are formed together with the thermal exchange plate 68, thermal energy in the support fins 72 can move directly to the thermal exchange plate 68. Thermal energy can move from the support fins 72 directly to the thermal exchange plate 68 without passing through any gap or interface, and without moving through any thermal interface material (TIM) separate from the battery cell support structure 64.

In another non-limiting embodiment, thermal energy is moved from the support fins 72 to the battery cell assemblies 60. In such an example, the battery cell support structure 64 acts as a heater for the battery cell assemblies 60.

The cavities 88 have a height $H_1$ that generally corresponds to a height $H_2$ of the battery cell assemblies 60. Thus, when the battery cell assemblies 60 are positioned within the cavities 88, the second surface 94 of the battery cell assemblies 60 is generally aligned with a tip portion 100 of the support fins 72. The second surface 94 faces upwardly in this example.

In this non-limiting embodiment, the support fins 72 have a thickness $T_1$ that is substantially constant from the thermal exchange plate 68 all the way to the tip portion 100. In some examples, the thickness $T_1$ could be from 1 millimeter to 5 millimeters. In one non-limiting embodiment, the thickness is 2 millimeters. In another example, the thickness of the support fins 72 decreases moving away from the thermal exchange plate 68.

When the battery cell support structure 64 is used to cool the battery cell assemblies 60, thermal energy from the battery cell assemblies 60 is moved to the thermal exchange plate 68, and is then transferred to a flow of air F moving through the channels 102 between the coolant fins 76. A fan could be used to direct a flow of air through the channels 102. Ram air, based on a velocity of the electrified vehicle, could instead, or additionally, move through the channels 102.

Since the coolant fins 76 are formed together with the thermal exchange plate 64, thermal energy can move directly from the thermal exchange plate 68 to the coolant fins 76 without passing across a gap, or passing through any TIM.

The axial positions of the coolant fins 76 are aligned with the support fins 72 in this example, which can further promote thermal energy transfer from the support fins 72, through the thermal exchange plate 68, to the coolant fins 76.

Figure 4:
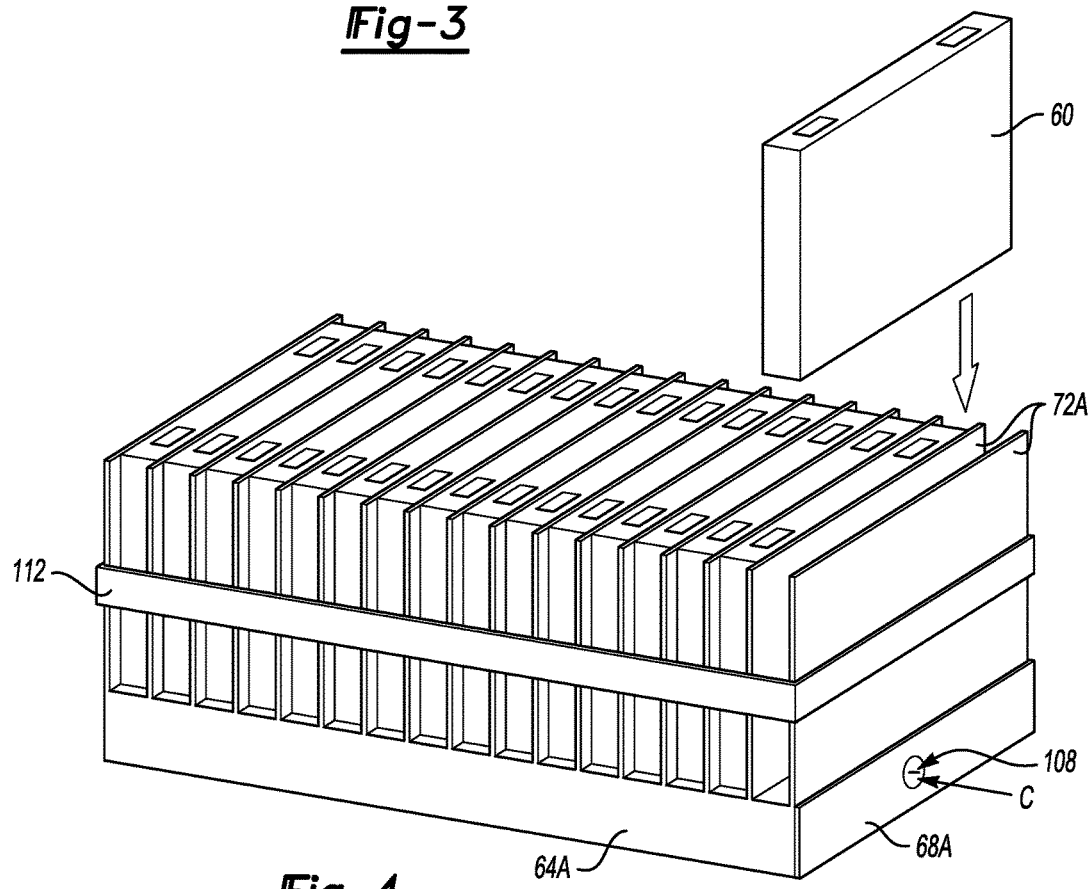
FIG. 4 illustrates a perspective view of a battery array for use in the battery pack of the powertrain of FIG. 1 according to another example embodiment.

Referring now to FIG. 4, another example battery cell support structure 64A includes support fins 72A configured similarly to the support fins 72 of FIGS. 2 and 3. Thermal energy can move between the support fins 72A and a thermal exchange plate 68A of the battery cell support structure 64A.

In the example embodiment of FIG. 4, thermal energy can be communicated from the thermal exchange plate 68A via a liquid coolant C that is circulated through an opening 108 through a conduit formed within the thermal exchange plate 68A. The liquid coolant C can take on thermal energy form the thermal exchange plate 68A when moving though the conduit, and then exit the conduit to carry the thermal energy away from the thermal exchange plate 68A. The liquid coolant C could be in fluid communication with a primary cooling circuit of the electrified vehicle.

In the example of FIG. 4, a compression band 112 circumferentially surrounds the support fins 72A. The compression band 112 can axially compress the battery cell assemblies between the support fins 72A. The compression band 112 can limit expansion of the battery cell assemblies 60.

Notably, the compression band 112 could be used in connection with the embodiment of FIGS. 2 and 3. Structures other than the compression band 112, such as rods, could be used to axially compress the cell assemblies within the cavities 88 if required.

Features of the disclosed examples include a battery cell support structure configured to facilitate thermal energy transfer between battery cell assemblies and a thermal exchange plate. The battery cell support structure includes support fins that directly contact the thermal exchange plate and provide cavities for receiving one or more battery cell assemblies. Accordingly, there is no gap between the support fins and the thermal exchange plate, which can facilitate thermal energy transfer. Further, the support fins provide a relatively large contact area with the battery cell assemblies, which can facilitate thermal energy transfer.

In some non-limiting embodiments, the thermal exchange plate is extruded with the support fins. In other examples, the support fins could be welded or otherwise secured to the thermal exchange plate.

The incorporation of the support fins extending directly from the thermal exchange plate to the area between axially adjacent battery cell assemblies has been found to reduce a temperature gradient across the battery cells assemblies by 16 degrees Celsius in some examples.

The preceding description is exemplary rather than limiting in nature. Variations and modifications to the disclosed examples may become apparent to those skilled in the art that do not necessarily depart from the essence of this disclosure. Thus, the scope of legal protection given to this disclosure can only be determined by studying the following claims.

What is claimed is:

1. A support structure for a battery cell assembly, comprising:
   a thermal exchange plate; and
   a plurality of support fins, a first and a second fin within the plurality of support fins providing a cavity to receive at least one battery cell assembly that is press-fit between the first and second fins, the plurality of support fins extending directly from the thermal exchange plate,
   wherein the cavity has a height and the at least one battery cell has a height that is the same as the cavity height.

2. The battery cell support structure of claim 1, further comprising a plurality of coolant fins extending in a direction from a side of the thermal exchange plate, wherein the plurality of support fins extend from an opposite side of the thermal exchange plate, the plurality of support fins and the thermal exchange plate providing a plurality of fluid channels that open in the direction.

3. The battery cell support structure of claim 2, wherein the thermal exchange plate provides a conduit configured to communicate a coolant.

4. A method of supporting a battery cell assemblies within a battery pack, comprising:
   positioning at least one battery cell assembly within a cavity provided by a plurality of support fins extending directly from a thermal exchange plate; and
   press-fitting the at least one battery cell assembly into the cavity during the positioning,
   wherein the cavity has a height and the at least one battery cell has a battery cell height that corresponds to the cavity height.

5. The method of claim 4, wherein the cavity has a first width, and the at least one battery cell assembly has a second width greater than the first width prior to the positioning.

6. The battery cell support structure of claim 1 comprising a conductive paste or thermal grease that facilitates insertion of the at least one battery cell assembly into the cavity.

7. The battery cell support structure of claim 1, wherein the first and second fins each have a thickness that is nominally constant from the thermal exchange plate to a tip portion of the respective fin.

8. The battery cell support structure of claim 1, further comprising a compression band that compresses the first and second fins axially against the at least one battery cell assembly, wherein the first and second fins are compressed axially against opposing axially facing sides of the at least one battery cell, and opposing laterally facing sides of the at least one battery cell are uncompressed, wherein the compression band circumferentially surrounds the plurality of support fins.

9. The method of claim 4, further comprising facilitating the press-fitting of the at least one battery cell into the cavity using a conductive paste or thermal grease.

10. The method of claim 4, wherein each of the plurality of support fins has a thickness that is constant from the thermal exchange plate to a tip portion of the respective support fin.

11. The method of claim 4, further comprising press-fitting by compressing the at least one battery cell axially without compressing laterally facing sides of the at least one battery cell.

12. The battery cell support structure of claim 1, wherein, when the battery cell is press-fit between the first and second fins, the first and second fin each extend from the thermal exchange plate to a position that is aligned with a surface of the at least one battery cell assembly, wherein terminals of the at least one battery cell assembly extend through the surface.

13. The battery cell support structure of claim 1, wherein the cavity has a first width, and the at least one battery cell assembly has a second width greater than the first width prior to the at least one battery cell assembly being press-fit between the first and second fins.

14. The battery cell support structure of claim 2, wherein axial positions of the coolant fins are axially aligned with axial positions of the support fins.

15. The method of claim 4, wherein the cavity height and the battery cell height are in a direction D, wherein the plurality of support fins extend directly from the thermal exchange plate in the direction D.

16. A battery array assembly, comprising:
   a plurality of battery cells disposed along an axis;
   a thermal exchange plate; and
   a plurality of support fins, each of the support fins axially spaced from the other support fins to provide a plurality of cavities,
   at least one of the plurality of battery cells press-fit within each of the cavities, the support fins extending directly from thermal exchange plate in a direction D plate at least as far as a surface of the at least one of the plurality of battery cells, the plurality of battery cells each including at least one terminal extending through the surface in the direction D.

17. The battery array assembly of claim 16, wherein the support fins extend from a first side of the thermal exchange plate in the direction D, wherein a height of the plurality of cavities in the direction D corresponds to a height of the plurality of battery cells in the direction D.

18. The battery array assembly of claim 17, further comprising a plurality of coolant fins extending from an opposite second side of the thermal exchange plate, the plurality of support fins and the thermal exchange plate providing a plurality of fluid channels, wherein axial positions of the coolant fins are axially aligned with axial positions of the support fins.

* * * * *